United States Patent [19]

Weber et al.

[11] Patent Number: 4,940,629

[45] Date of Patent: Jul. 10, 1990

[54] FIBER REINFORCED THERMOPLASTIC INTEGRAL SKIN FOAMS AND MANUFACTURE THEREOF

[75] Inventors: Heinz Weber, Gruenstadt; Gerhard Bleckmann, Lampertheim; Gerhard Dembek, Bad Duerkheim; Gerd Ehrmann, Deidesheim; Gerhard Heinz, Weisenheim; Lothar Schlemmer, Maxdorf, all of Fed. Rep. of Germany

[73] Assignee: BASF Aktiengesellschaft, Ludwigshafen, Fed. Rep. of Germany

[21] Appl. No.: 342,143

[22] Filed: Apr. 24, 1989

[30] Foreign Application Priority Data

May 5, 1988 [DE] Fed. Rep. of Germany ....... 3815723

[51] Int. Cl.$^5$ ............................ B32B 7/02; B32B 3/26
[52] U.S. Cl. ..................................... 428/213; 428/218; 428/220; 428/269; 428/304.4; 428/318.6; 428/318.8; 264/45.5
[58] Field of Search ................... 428/318.6, 318.8, 213, 428/218, 220, 269, 304.4; 264/45.5

[56] References Cited

U.S. PATENT DOCUMENTS 4,766,031 8/1988 Kohl .................................. 428/318.8

*Primary Examiner*—William J. Van Balen
*Attorney, Agent, or Firm*—William G. Conger

[57] ABSTRACT

Fiber reinforced thermoplastic integral skin foams of density 50–500 kg/m$^3$ have an outer skin 0.05 to 1.5 mm in thickness and contain from 2 to 60% by weight of reinforcing fibers.

4 Claims, No Drawings

FIBER REINFORCED THERMOPLASTIC INTEGRAL SKIN FOAMS AND MANUFACTURE THEREOF

The present invention relates to thermoplastic integral skin foams which are reinforced with fiber mats.

Thermoplastics which are reinforced with fiber mats, in particular glass fiber mats, have become established in industry for the manufacture of formed parts for a wide range of purposes, such as car seats, monocoque shells, engine housings, musical instruments, boxes and the like. They are manufactured by pressmolding fiber mats with a melt of the thermoplastic. The composite materials are formable by heating and pressing in molds into articles of any desired shape.

Thermoplastic integral skin foams, i.e. foams based on thermoplastics which have a solid outer skin, have likewise become successfully established in industry for the manufacture of furniture and housings, in the automotive sector, in the transport business and in the building and sports equipment industries. They are manufactured from thermoplastics by addition of chemical blowing agents which on heating give off a gas, and extrusion or injection molding.

It is an object of the present invention to reduce the density of known composite materials based on fiber mat reinforced thermoplastics with substantial retention of mechanical strength. It is another object of the present invention to confer higher stiffness and strength on the thermoplastic integral skin foams. It is yet a further object to provide composite materials which are notable for low density, excellent heat insulation properties, an outer skin of high strength and high surface quality, high flexural strength, high energy absorption in relation to mechanical impact, reduced thermal expansion and cold flow tendency and a favorable flammability rating combined with simple manufacturing and processing properties.

We have found that these objects are achieved by thermoplastic integral skin foams with solid outer skin which contain reinforcing fibers in mat form.

The present invention accordingly provides fiber reinforced thermoplastic integral skin foams of density 50–500 kg/m$^3$ having a solid outer skin 0.05–1.5 mm in thickness, containing from 2 to 60 % by weight of reinforcing fibers in mat form having a median fiber length of not less than 50 mm.

The present invention further provides a process for manufacturing these fiber reinforced thermoplastic integral skin foams, which comprises pressmolding fiber mats with the melt of a blowing agent containing thermoplastic polymer under a pressure at which any foaming of the melt is prevented, then foaming the fiber mat reinforced, blowing agent containing polymer at temperatures above the softening point, and, after the foam has become solid, again compacting the outer skin at temperatures above the softening point.

EP-A-No. 148,763 discloses glass fiber reinforced thermoplastic moldings containing 7–50 mm long glass fibers. The outer skin of the moldings has not been compacted.

No. WO 84/03,095 discloses crosslinked foams based on polystyrene, polyether imide or polyether sulfone which contain 10–55 % by weight of reinforcing fibers from 3 to 25 mm in length. The outer skin of the foams has not been compacted.

The integral skin foams according to the invention are from 50 to 500 kg/m$^3$, in particular from 100 to 350 kg/m$^3$, preferably from 100 to 250 kg/m$^3$, in density. The integral skin foams have a solid outer skin. The density of the outer skin, which in general is from 0.05 to 1.5 mm, preferably from 0.2 to 0.9 mm, in thickness is from 1.5 to 20 times, preferably from 2 to 10 times, the density of the core zone. The drop in density from the skin to the core can be continuous. Renewed compaction of the outer skin brings about a steeper drop in density. The result is then a sandwichlike structure. Here the outer skin can have the same density as the unfoamed material.

The basis of the integral skin foam according to the invention is a thermoplastic. The thermoplastic is chosen according to the temperature stability desired for the integral skin foam. Suitable thermoplastics are polyolefins, such as polyethylene and polypropylene, styrene polymers, such as polystyrene, poly-α-methylstyrene, copolymers which contain not less than 50% by weight of styrene units, such as styrene-acrylonitrile copolymers, impact resistant polystyrene of the ABS or ASA type, and other rubber containing polystyrenes, polyamides, such as nylon 6, nylon 6.6, nylon 4.6, nylon 12 and nylon 6.12, aromatic polycarbonates, such as bisphenol A polycarbonate, aromatic polyether sulfones, for example the polyether sulfones obtainable by polycondensation of bisphenol A and/or bisphenol S and p,p'-dichlorodiphenyl sulfone in the presence of alkali, polyphenylene ethers, such as poly-2,6-dimethylphenylene oxide, polyphenylene sulfide, and mixtures thereof. The thermoplastic may also be chosen according to its flammability rating. To obtain good fire resistance, aromatic polyether sulfones, polyphenylene sulfide, polycarbonates or even polyamides are preferred.

The novel integral skin foams contain from 2 to 50 % by weight, preferably from 5 to 30 % by weight, in particular from 10 to 25 % by weight, of reinforcing fibers in mat form. The fiber mats are unitary sheetlike structures of random-laid continuous fibers, of cut fibers in nonoriented distribution, or of completely or partially directed continuous or cut fibers. Preference is given to mats of continuous nonoriented fibers having a basis weight of from 100 to 1200 g/m$^2$. The fiber mats can be unconsolidated. However, they can also have been consolidated by means of polymeric binders or by mechanical bonding techniques, for example needling, sewing or quilting. The fibers used are for example carbon fibers, metal fibers, fibers or aromatic polyamide and in particular glass fibers. The individual fibers are in general from 8 to 15 μm in diameter and have a median length of not less than 50 mm, preferably not less than 250 mm. In place of individual fibers it is also possible to use bundles of a plurality of individual fibers with or without interbonding. The fiber mats are in general elastic. They can be compacted by compression and, when the compacting force is removed, recover to their original thickness. Advantageously they are also expandable; that is, when the thermoplastic melt is being foamed they expand in the same way as the expanding thermoplastic, so that the fiber is uniformly distributed over the entire thickness of the resulting foam. A uniform distribution is obtained in particular with loosely held fibers which show high affinity for the thermoplastic. The expanding foam then entrains the fibers. On the other hand, the fibers also have a gradual stabilizing effect on the expanding polymer. The process of expansion takes place in controlled fashion.

The adhesion of the fibers can also be improved by a suitably chosen size.

It is even possible to use metal fibers or metallized carbon fibers to produce composites which are very stiff for their size and which find utility as screening materials against electromagnetic effects.

It is specifically in the case of fiber reinforced polyamide foam that the fibers diminish the dimensional changes due to ambient moisture levels.

It is found in general that the fibers introduced into the foamable substrate have a strong nucleating effect. If no fibers or other nucleating agents are added, coarse-celled, nonuniform foams are produced. The nucleating effect is particularly pronounced on addition of short glass fibers (0.2–0.6 mm).

The integral skin foams may in addition contain customary additives in effective amounts, such as dyes, pigments, antistats, lubricants, flame retardants and nucleating agents.

To produce the fiber mat reinforced integral skin foams, the fiber mats are pressmolded with the blowing agent containing melt of the thermoplastic under a pressure at which any foaming of the melt is prevented.

The blowing agents used are low boiling liquids which boil at temperatures below the melting temperature of the thermoplastic used and which are soluble at the melting temperature in the thermoplastic under pressure. Suitable blowing agents are for example aliphatic and cycloaliphatic hydrocarbons of from 4 to 8 carbon atoms, such as butane, pentane, hexane, cyclohexane, heptane and octane, aromatic hydrocarbons of from 6 to 8 carbon atoms, such as benzene, toluene and xylene, alcohols of from 2 to 4 carbon atoms, such as ethanol, propanol, i-propanol and butanol, ketones of from 3 to 5 carbon atoms, such as acetone, methyl ethyl ketone and diethyl ketone, cyclic ethers of from 4 to 6 carbon atoms such as diethyl ether and diisopropyl ether, esters of from 4 to 6 carbon atoms, such as ethyl acetate, methyl propionate, propyl acetate and butyl acetate, hydrochlorocarbons of 1 or 2 carbon atoms such as methylene chloride, chloroform, dichloroethane, trichloroethane and chlorobenzene, water, and mixtures thereof.

The blowing agents are used in general in an amount of from 4 to 30 % by weight, preferably from 4 to 25 % by weight, in particular from 8 to 18 % by weight, based on the thermoplastic. The most suitable blowing agent and the most suitable amount thereof are each readily determinable experimentally for the particular thermoplastic.

The most suitable blowing agents for the foaming of polyolefins and styrene polymers are aliphatic hydrocarbons and halohydrocarbons. As well as aliphatic hydrocarbons, good blowing agents for polyamides are alcohols and in particular water. Aromatic polycarbonates, polyether sulfones, polyphenylene ethers and polyphenylene sulfide are advantageously foamed using hydrochlorocarbons, alcohols, ketones, ethers or esters.

To manufacture the foam, the fiber mat reinforced, blowing agent containing polymer is foamed at temperatures above the softening point of the mixture. After the foam has become solid, the outer skins are again compacted at temperatures above the softening point, for example by using a hot press to compress the foam to 90–25 %, preferably 80–40 %, of its volume.

The foams are laminable in a conventional manner with various cover layers, for example with those made of wood, compressed melamine resin board, with plastics films or sheets or with metal foils or plates. It is also possible to use resin impregnated glass fiber fabrics having basis weights of from 100 to 300 g/m² (based on glass).

The bond to the cover layer can as usual be effected with contact or hot-melt adhesives. It is frequently possible to combine the step of laminating without such assistants with the mandatory step of compacting the outer skins at temperatures above the polymer softening point.

An even simpler way of obtaining the laminates comprises pressmolding for example unimpregnated glass fiber fabrics in the first step together with the reinforcing fiber mats and the blowing agent containing polymer.

EXAMPLE 1

Commercial expandable polystyrene in bead form containing 5 % by weight of pentane as blowing agent is pressmolded in a pressure-resistant mold at 110° C. into 1 mm thick sheets, which are then cooled down to room temperature. A heatable and coolable, pressure-resistant positive mold is entered with a 1 mm thick blowing agent containing polystyrene sheet and a glass fiber mat of basis weight 300 g/m² having a fiber length of not less than 250 mm (diameter of individual fibers 11 μm, type U814/300 from Gevetex). The press is closed and heated up to 120°–140° C. under a pressure of 40 bar. In the course of the heating, the blowing agent containing polystyrene melt evenly infiltrates the compressed glass fiber mat. On opening the molding press, the sheet expands to a fiber reinforced foam 13 mm in thickness. After it has cooled down, the foam is briefly compressed at 150° C. to a thickness of 11 mm.

The result is an integral skin foam in sheet form of density 180 kg/m³ which contains 12 % by weight of glass fibers in mat form.

The density of the core is 134 kg/m³. The surface is perfectly smooth. The composite material has an approximately 0.3 mm thick, substantially compact surface layer whose density is 540 kg/m³.

The flexural strength of the integral skin foam is 4.3 MPa, measured in accordance with German Standard Specification DIN 53423.

EXAMPLE 2

Polyether sulfone $(O-C_6H_4-SO_2-C_6H_4)_n$ of viscosity number 55 (measured at 25° C., 1 g/100 cm³ of N-methylpyrrolidone) and the same weight of methyl ethyl ketone are digested with each other until a gel forms, excess methyl ethyl ketone is separated off, and the gel, to which 1 % by weight of aluminum stearate has been added as a nucleating agent, is homogenized at 50° C. in a kneader and pressmolded below 100° into 2 mm thick sheets. Following 3 days' storage of the sheets the level of methyl ethyl ketone is 13 % by weight. The glass transition temperature of the mixture is 70° C., measured by DSC.

In a platen press, a 1.8 mm thick sheet of polyether sulfone containing 12 % by weight of methyl ethyl ketone is pressmolded at 220° C. between two glass fiber mats (basis weight 300 g/cm³, type U814 from Gevetex, fiber diameter 11 μm, median fiber length >250 mm). Cooling down and demolding gives a foamable sheet 2 mm in thickness.

The sheet is heated in a platen press to 200°. On opening the press, the sheet expands into an approximately 18 mm thick sheet of foam. Most of the blowing agent escapes at the same time; the glass fiber strands end up uniformly distributed in the foam. The outer skins are compacted by briefly pressmolding again at 260° C. This compaction has the effect of firmly embedding the fibers in the polymer of the skin layer. The result is an 8.4 mm thick fiber reinforced integral skin foam sheet of density 280 kg/m$^3$ containing 29 % by weight of glass fibers. The compressive strength at 10 % compression by German Standard Specification DIN 53421 is 0.46 MPa, and the flexural strength by German Standard Specification DIN 53423 is 10.3 MPa. The outer skin has a thickness of 0.8 mm, and the flexural modulus of elasticity is 823 MPa, measured in accordance with German Standard Specification DIN 53457.

If the above procedure is repeated except that the sheet is only compacted from 18 mm down to 12.3 mm thickness, the density of the integral skin foam is 200 kg/m$^3$. The compressive strength is 0.5 MPa, and the flexural strength is 5.9 MPa. The density of the core zone is 124 kg/m$^3$. The outer skin of 0.6 mm has a density of 650 kg/m$^3$. The flexural modulus of elasticity is 393 MPa.

EXAMPLE 3

Similarly to Example 2, two 1.0 mm thick sheets of polyether sulfone containing 12 % by weight of methyl ethyl ketone are pressmolded at 220° to a glass fiber mat (300 g/m$^2$) placed between the two sheets. The resulting foamable sheet product 2.1 mm in thickness is heated in a platen press to 200°. On opening the press, the sheet product expands to a 22 mm thick foam sheet which, owing to the embedded glass fibers (11 % by weight), still has a crude looking, speckly surface. After briefly smoothing away these irregularities in a press at 260° the sheet has a solid outer skin about 0.05 mm in thickness. The overall preliminary density is 97 kg/m$^3$, the compressive strength is 0.71 MPa and the flexural strength is 1.1 MPa.

This smoothed foam sheet precursor can be compressed in a press at 260° ad libitum. The result is a very solid outer skin of increasing thickness and density, while the core zone is less changed. Increasing compaction gives increasing flexural strength values:

| Example | Thickness (mm) Overall | Outer skin | Density (kg/m$^3$) Overall | Outer skin | Compressive strength (10%) (MPa) (DIN 53421) | Flexural strength (MPa) (DIN 42423) | Flexural modulus of elasticity (MPa) (DIN 53457-B4) |
|---|---|---|---|---|---|---|---|
| 3a | 22 | ca. 0.05 | 97 | — | 0.71 | 1.1 | — |
| 3b | 15.1 | 0.7 | 148 | 580 | 0.68 | 2.8 | 213 |
| 3c | 10.0 | 0.9 | 244 | 830 | 0.55 | 7.7 | 696 |

The heat conductivity of integral skin foam 3b, measured at 10° C. in accordance with German Standard Specification DIN 52612, was 0.040 W/mK. Sheet 3b measuring 35×35×1.5 cm can be hot molded into a semicylinder 22 cm in diameter and cut open in the longitudinal axis. This hot molding is done in a compression mold at 240° with concave seat and convex ram. Demolding is preceded by cooling down to 180°.

EXAMPLE 4

In a twin-screw extruder, 15 parts by weight of polyether sulfone (viscosity number 55) and 0.15 part of aluminum stearate are melted per hour at 340°, 2.2 parts by weight of acetone are metered in per hour, and the blowing agent containing melt is cooled down to 105° and discharged via a sheet die. The resulting sheet web only foams up a small amount and still contains 11 % by weight of acetone. It is drawn off at 80° over a calender and smoothed.

Sheets 3 mm in thickness and having a blowing agent content of 11 % by weight are pressmolded at 220° in a platen press between 2 glass fiber mats (basis weight 450 g/m$^2$, type U814/450 from Gevetex). The glass fiber content is 16 %.

The blowing agent containing, fiber mat reinforced mass is expanded at 200° C. to a foam sheet 24 mm in thickness, which, after the foam has become solid, is compacted at 260° C. down to 15 mm.

The integral skin foam obtained has a density of 158 kg/m$^3$, a core density of 119, a 0.5 mm outer skin of 610 kg/m$^3$ in density and the following mechanical properties:

compressive strength at 10 % compression: 0.68 MPa; flexural strength 3.4 MPa.

EXAMPLE 4a (COMPARATIVE TEST)

A 1.4 mm thick glass fiber free sheet of polyether sulfone which contains 12 % by weight of methyl ethyl ketone is foamed up at 170° in a platen press and briefly smoothed at 260°. Owing to the absence of the stabilizing glass fiber mat, the foaming is directionless and is more difficult to control.

The result is a 17.2 mm thick, coarse celled foam sheet having an overall density of 102 kg/m$^3$ and an outer skin of about 0.05 mm. The compressive strength (10 %) is 0.66 MPa, the flexural strength is 0.5 MPa, and the flexural modulus is 29 MPa.

EXAMPLE 5

Example 3 is repeated, except that the glass fiber mat is replaced by a needled glass fiber felt of basis weight 700 g/m$^2$, affording, following compaction at 260°, an integral skin foam sheet 9.7 mm in thickness which has a glass fiber content of 30 % by weight and a solid outer skin 0.8 mm in thickness. The density is 310 kg/m$^3$, the compressive strength at 10 % and 15 % compression is 0.83 and 1.23 MPa respectively, and the flexural strength is 19 MPa.

EXAMPLE 6

Granules of copolyamide 6/66 (85/15) having a melting temperature of 196° (German Standard Specification DIN 53736, method A) are molded at 220° into 1 mm thick sheets. A glass fiber mat of basis weight 300 g/m$^2$ is placed between two such sheets, and this layup is again molded at the above temperature to 2 mm thick glass fiber containing sheets. These are stored at 70° in a 1:1 water/ethanol mixture for 2 days. Their weight increase is then 14.5 %, and they are foamable in a hot press at 175° to 11 mm thick, glass fiber containing precursor sheets. Compaction in a press at 220° gives 7 mm thick, fiber reinforced integral skin foam sheets having an overall preliminary density of 320 kg/m$^3$. The outer skin, 0.5 mm thick, has a density of 670 kg/m$^3$.

If the unfoamed, glass fiber containing sheets are stored in water at 80° for 10 hours, their weight increases by 9.7 %. They are foamable at 180° to give precursor sheets 8 mm in thickness. Compaction in a press at 220° gives a 5 mm thick integral skin foam sheet containing 11.2 % by weight of glass fibers. Its preliminary density is 380 kg/m$^3$ and its flexural strength is 9.6 MPa measured under standard conditions (23°/50 % relative humidity).

EXAMPLE 7

Example 3 is repeated, except that the glass fiber mat is replaced by a needlona KR52 polyaramid fiber felt (Bay. Wollfilzfabriken, Offingen) of basis weight 50 g/m$^2$, affording, as described, an integral skin foam sheet 5.8 mm in thickness and having a solid outer skin 0.7 mm thick and a fiber content of 3 % by weight. The density is 220 kg/m$^3$, the compressive strength is 0.7 MPa and the flexural strength is 9.2 MPa.

EXAMPLE 8

Two 1 mm thick sheets of polyether sulfone containing 12 % by weight of methyl ethyl ketone are mold fonded at 250° to a steel wool random laid web of basis weight 200 g/m$^2$ placed in between the two. The steel fiber length is from 10 to 150 mm, the diameter is 70 μm, and the weight proportion is 43 % by weight.

The laminate is foamed in the press at 200° and is then compacted at 260° to give a 5.5 mm thick, fiber containing integral skin foam sheet. The solid outer skin is 0.6 mm in thickness. The density is 660 kg/m$^3$, and the compressive strength is 1.1 MPa. The screening effect in a magnetic near field is 28 dB at 30 MHz.

EXAMPLE 9

Polycarbonate granules (SINVET 251/00 from Anic; viscosity number 0.7 [dl/g], measured at 25° in methylene chloride) are molded at 200° into 1 mm thick sheets. A glass fiber mat of basis weight 300 g/m$^2$ is placed between two such sheets, and this layup is molded at 210° C. into a foam sheet precursor. This precursor, which has a glass fiber content of 16.5 % by weight, is stored for 3 days in a mixture of 6:4 (v/v) acetone/methylene chloride at room temperature. The weight increases by 30 %. The blowing agent containing sheets are foamed in a platen press at 170° and then compacted at 190° to give a 6 mm thick, glass fiber containing integral skin foam sheet.

The density is 360 kg/m$^3$, the compressive strength is 0.65 MPa and the flexural strength is 5.7 MPa.

We claim:

1. A fiber reinforced thermoplastic integral skin foam of density 50–500 kg/m$^3$ having a solid outer skin 0.05–1.5 mm in thickness, containing from 2 to 60 % by weight of reinforcing fibers in mat form having a median fiber length of not less than 50 mm.

2. A fiber reinforced thermoplastic integral skin foam as claimed in claim 1, wherein the foam consists of a polyolefin, a styrene polymer, a polyamide, an aromatic polycarbonate, an aromatic polyether sulfone, a polyphenylene ether or a polyphenylene sulfide.

3. A fiber reinforced thermoplastic integral skin foam as claimed in claim 1, wherein the reinforcing fibers in mat form consist of glass, carbon, aromatic polyamide or metal.

4. A process for manufacturing a fiber reinforced thermoplastic integral skin foam as claimed in claim 1, which comprises pressmolding fiber mats with the melt of a blowing agent containing thermoplastic polymer under a pressure at which any foaming of the melt is prevented, then foaming the fiber mat reinforced, blowing agent containing polymer at temperatures above the softening point, and, after the foam has become solid, again compacting the outer skin at temperatures above the softening point.

* * * * *